US 7,987,189 B2

(12) United States Patent
Anderson et al.

(10) Patent No.: US 7,987,189 B2
(45) Date of Patent: Jul. 26, 2011

(54) CONTENT DATA INDEXING AND RESULT RANKING

(75) Inventors: Christopher Walter Anderson, Redmond, WA (US); Harish Jayanti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 11/841,332

(22) Filed: Aug. 20, 2007

(65) Prior Publication Data
US 2007/0282831 A1 Dec. 6, 2007

Related U.S. Application Data

(63) Continuation of application No. 10/187,859, filed on Jul. 1, 2002, now Pat. No. 7,266,553.

(51) Int. Cl.
G06F 17/30 (2006.01)
G06F 7/00 (2006.01)
(52) U.S. Cl. .................................... 707/741; 707/917
(58) Field of Classification Search .................. None
See application file for complete search history.

(56) References Cited

U.S. PATENT DOCUMENTS

| | | | |
|---|---|---|---|
| 4,471,459 A * | 9/1984 | Dickinson et al. ............ 715/202 |
| 4,823,306 A * | 4/1989 | Barbic et al. ..................... 707/5 |
| 5,265,065 A * | 11/1993 | Turtle ............................... 707/4 |
| 5,303,361 A | 4/1994 | Colwell |
| 5,321,833 A * | 6/1994 | Chang et al. ..................... 707/5 |
| 5,369,577 A * | 11/1994 | Kadashevich et al. ........... 704/9 |
| 5,374,928 A * | 12/1994 | Moore et al. ..................... 341/67 |
| 5,404,514 A * | 4/1995 | Kageneck et al. ................. 707/5 |
| 5,469,354 A * | 11/1995 | Hatakeyama et al. ............ 707/3 |
| 5,696,962 A * | 12/1997 | Kupiec .............................. 707/4 |
| 5,701,469 A * | 12/1997 | Brandli et al. ................. 707/102 |
| 5,704,060 A | 12/1997 | Del Monte |
| 5,721,897 A * | 2/1998 | Rubinstein ........................ 707/2 |
| 5,724,576 A | 3/1998 | LeTourneau |
| 5,778,361 A * | 7/1998 | Nanjo et al. ...................... 707/5 |
| 5,787,432 A | 7/1998 | LeTourneau |
| 5,787,435 A * | 7/1998 | Burrows ........................ 707/102 |
| 5,787,437 A | 7/1998 | Potterveld |
| 5,809,502 A * | 9/1998 | Burrows .......................... 707/7 |
| 5,832,499 A * | 11/1998 | Gustman .................. 707/103 R |
| 5,835,905 A * | 11/1998 | Pirolli et al. ...................... 707/3 |
| 5,838,965 A | 11/1998 | Kavanagh |
| 5,864,863 A * | 1/1999 | Burrows ................... 707/103 R |
| 5,878,411 A | 3/1999 | Burroughs |
| 5,893,916 A * | 4/1999 | Dooley .......................... 715/234 |
| 5,913,215 A * | 6/1999 | Rubinstein et al. ............. 707/10 |

(Continued)

OTHER PUBLICATIONS

Dillon, M. and A.S. Gray "FASIT: A Fully Automatic Syntactically Based Indexing System", Journal of the American Society for Information Science, vol. 34, No. 2, Mar. 1983, pp. 99-108.*

(Continued)

*Primary Examiner* — Luke S Wassum
(74) *Attorney, Agent, or Firm* — Workman Nydegger

(57) ABSTRACT

A full text indexing system is provided for processing content associated with data applications such as encyclopedia and dictionary applications. A build process collects data from various sources, processes the data into constituent parts, including alternative word sets, and stores the constituent parts in structured database tables. A run-time process is used to query the database tables and the results in order to provide effective matches in an efficient manner. Run-time processing is optimized by preprocessing all steps that are query-independent during the build process. A double word table representing all possible word pair combinations for each index entry and an alternative word table are used to further optimize runtime processing.

19 Claims, 10 Drawing Sheets

U.S. PATENT DOCUMENTS

| | | | |
|---|---|---|---|
| 5,963,954 A * | 10/1999 | Burrows | 707/102 |
| 5,963,965 A * | 10/1999 | Vogel | 715/236 |
| 6,014,647 A | 1/2000 | Nizzari | |
| 6,021,409 A * | 2/2000 | Burrows | 707/102 |
| 6,026,398 A | 2/2000 | Brown | |
| 6,038,561 A * | 3/2000 | Snyder et al. | 707/6 |
| 6,044,365 A * | 3/2000 | Cannon et al. | 707/2 |
| 6,067,543 A * | 5/2000 | Burrows | 707/4 |
| 6,067,552 A * | 5/2000 | Yu | 715/234 |
| RE36,727 E * | 6/2000 | Kageneck et al. | 707/3 |
| 6,081,774 A | 6/2000 | De Hita | |
| 6,092,080 A * | 7/2000 | Gustman | 707/103 R |
| 6,112,202 A * | 8/2000 | Kleinberg | 707/5 |
| 6,175,830 B1 * | 1/2001 | Maynard | 707/5 |
| 6,178,396 B1 * | 1/2001 | Ushioda | 704/1 |
| 6,199,081 B1 * | 3/2001 | Meyerzon et al. | 715/210 |
| 6,202,064 B1 * | 3/2001 | Julliard | 707/5 |
| 6,240,408 B1 * | 5/2001 | Kaufman | 707/3 |
| 6,317,741 B1 | 11/2001 | Burrows | |
| 6,336,112 B2 * | 1/2002 | Chakrabarti et al. | 707/5 |
| 6,338,056 B1 | 1/2002 | Dessloch | |
| 6,353,831 B1 * | 3/2002 | Gustman | 707/103 R |
| 6,360,215 B1 * | 3/2002 | Judd et al. | 707/3 |
| 6,411,950 B1 | 6/2002 | Moricz | |
| 6,415,283 B1 | 7/2002 | Conklin | |
| 6,418,448 B1 | 7/2002 | Sakar | |
| 6,446,064 B1 | 9/2002 | Livowsky | |
| 6,453,339 B1 | 9/2002 | Schultz | |
| 6,473,753 B1 * | 10/2002 | Katariya et al. | 707/4 |
| 6,484,166 B1 * | 11/2002 | Maynard | 707/5 |
| 6,493,692 B1 * | 12/2002 | Kobayashi et al. | 706/46 |
| 6,493,705 B1 * | 12/2002 | Kobayashi et al. | 707/3 |
| 6,502,091 B1 * | 12/2002 | Chundi et al. | 707/3 |
| 6,542,889 B1 * | 4/2003 | Aggarwal et al. | 707/5 |
| 6,549,897 B1 * | 4/2003 | Katariya et al. | 1/1 |
| 6,556,986 B2 | 4/2003 | Hara | |
| 6,557,002 B1 | 4/2003 | Fujieda et al. | |
| 6,571,240 B1 * | 5/2003 | Ho et al. | 707/5 |
| 6,574,622 B1 * | 6/2003 | Miyauchi et al. | 707/4 |
| 6,594,657 B1 | 7/2003 | Livowsky | |
| 6,598,039 B1 | 7/2003 | Livowsky | |
| 6,611,840 B1 | 8/2003 | Baer | |
| 6,633,869 B1 | 10/2003 | Duparcmeur | |
| 6,665,661 B1 * | 12/2003 | Crow et al. | 707/3 |
| 6,665,681 B1 * | 12/2003 | Vogel | 707/101 |
| 6,665,837 B1 * | 12/2003 | Dean et al. | 715/234 |
| 6,678,694 B1 * | 1/2004 | Zimmermann et al. | 707/102 |
| 6,697,793 B2 * | 2/2004 | McGreevy | 1/1 |
| 6,704,747 B1 | 3/2004 | Fong | |
| 6,714,939 B2 * | 3/2004 | Saldanha et al. | 707/102 |
| 6,721,728 B2 * | 4/2004 | McGreevy | 1/1 |
| 6,741,981 B2 * | 5/2004 | McGreevy | 1/1 |
| 6,751,343 B1 * | 6/2004 | Ferrell et al. | 382/145 |
| 6,775,666 B1 * | 8/2004 | Stumpf et al. | 707/5 |
| 6,789,230 B2 * | 9/2004 | Katariya et al. | 715/267 |
| 6,807,181 B1 | 10/2004 | Weschler | |
| 6,820,135 B1 | 11/2004 | Dingman | |
| 6,823,333 B2 * | 11/2004 | McGreevy | 1/1 |
| 6,834,276 B1 | 12/2004 | Jensen et al. | |
| 6,842,730 B1 * | 1/2005 | Ejerhed et al. | 704/9 |
| 6,983,287 B1 | 1/2006 | Jayanti et al. | |
| 7,266,553 B1 * | 9/2007 | Anderson et al. | 707/5 |
| 7,383,169 B1 * | 6/2008 | Vanderwende et al. | 704/9 |
| 7,426,507 B1 | 9/2008 | Patterson | |
| 7,536,408 B2 | 5/2009 | Patterson | |
| 7,567,959 B2 | 7/2009 | Patterson | |
| 7,580,921 B2 | 8/2009 | Patterson | |
| 7,580,929 B2 | 8/2009 | Patterson | |
| 7,584,175 B2 | 9/2009 | Patterson | |
| 7,599,914 B2 | 10/2009 | Patterson | |
| 7,603,345 B2 | 10/2009 | Patterson | |
| 7,693,813 B1 | 4/2010 | Cao et al. | |
| 2002/0022953 A1 * | 2/2002 | Bertolus et al. | 704/1 |
| 2002/0188587 A1 | 12/2002 | McGreevy | |
| 2003/0004914 A1 | 1/2003 | McGreevy | |
| 2003/0078913 A1 | 4/2003 | McGreevy | |
| 2004/0078190 A1 * | 4/2004 | Fass et al. | 704/7 |
| 2004/0133603 A1 * | 7/2004 | Chang et al. | 707/104.1 |
| 2004/0167889 A1 * | 8/2004 | Chang et al. | 707/3 |
| 2004/0225497 A1 * | 11/2004 | Callahan | 704/235 |
| 2005/0027702 A1 | 2/2005 | Jensen et al. | |
| 2005/0131886 A1 * | 6/2005 | Ejerhed et al. | 707/3 |
| 2005/0144160 A1 * | 6/2005 | Doerre et al. | 707/3 |
| 2005/0210003 A1 * | 9/2005 | Tsay et al. | 707/3 |
| 2006/0018551 A1 | 1/2006 | Patterson | |
| 2006/0020571 A1 | 1/2006 | Patterson | |
| 2006/0020607 A1 | 1/2006 | Patterson | |
| 2006/0031195 A1 | 2/2006 | Patterson | |
| 2009/0100080 A1 * | 4/2009 | Toms et al. | 707/100 |
| 2009/0307209 A1 * | 12/2009 | Carmel et al. | 707/5 |

OTHER PUBLICATIONS

Fagan, J.L. "The Effectiveness of a Nonsyntactic Approach to Automatic Phrase Indexing for Document Retrieval", Journal of the American Society for Information Science, vol. 40, No. 2, 1989, pp. 115-132.*

Salton, G. "Automatic Text Indexing Using Complex Identifiers", Proceedings of the ACM Conference on Document Processing Systems, 2000, pp. 135-144.*

Fagan NPL Reference Fagan, J..L., "The Effectiveness of a Nonsyntactic Approach to Automatic Phrase Indexing for Document Retrieval", Journal of the American Society for Information Science, vol. 40, No. 2, 1989, pp. 115-132.

Brill NPL Reference Brill, E. and M Marcus "Tagging an Unfamiliar Text with Minimal Human Supervision", Proceedings of the Fall Symposium on Probabilistic Approaches to Natural Language, AAAI Technical Report, 1992.

Salton NPL Reference Salton, G. and J Allan "Selective Text Utilization and Text Traversal", Proceedings of the Fifth ACM Conference on Hypertext and Hypermedia, Nov. 14-18, 1993, pp. 131-144.

Salton NPL Reference Salton, G., J. Allan and A. Singhal "Automatic Text Decomposition and Structuring", Information Processing & Management, vol. 32, No. 2, Mar. 1996, pp. 127-138.

Beeferman NPL Reference Beeferman, D. "Lexical Discovery with an Enriched Semantic Network", Proceedings of the ACL/COLING Workshop on Applications of WordNet in Natural Language Processing Systems, 1998, pp. 135-141.

Jacqeumin NPL Reference Jacqeumin, C. "Syntagmatic and Paradigmatic Representations of Term Variation", Proceedings of the 37th Annual Meeting of the Association for Computational Linguistics and Conference on Computational Linguistics, 1999, pp. 341-348.

Salton NPL Reference Salton, G. "Automatic Text Indexing Using Complex Identifiers", Proceedings of the ACM Conference on Document Processing Systems, 2000, pp. 135-144.

Dillon NPL Reference Dillon, M. and A.S. Gray "FASIT: A Fully Automatic Syntactically Based Indexing System", Journal of the American Society for Information Science, vol. 34, No. 2, 1983, pp. 99-108.

Croft NPL Reference Croft, W.B., H.R. Tuttle and D.D. Lewis "The Use of Phrases and Structured Queries in Information Retrieval", Proceedings of the 14th Annual ACM SIGIR Conference on Research and Development in Information Retrieval, 1991, pp. 32-45.

Mauldin NPL Reference Mauldin, M.L., "Retrieval Performance in FERRET: A Conceptual Information Retrieval System", Proceedings of the 14th Annual ACM SIGIR Conference on Research and Development in Information Retrieval, 1991, pp. 347-355.

Riloff NPL Reference Riloff, E. And W. Lenhert "Information Extraction as a Basis for High-Precision Text Classification", ACM Transactions on Information Systems, vol. 12, No. 3, 1994, pp. 296-333.

Kochtanek NPL Reference Kochtanek, T.R. "Document Clustering, Using Macro Retrieval", Journal of the American Society for Information Science, vol. 34, No. 5, pp. 356-359, Sep. 1983.

Office Action mailed Nov. 22, 2004 cited in related U.S. Appl. No. 10/187,859.

Office Action mailed May 4, 2005 cited in related U.S. Appl. No. 10/187,859.

Office Action mailed Sep. 26, 2005 cited in related U.S. Appl. No. 10/187,859.

Office Action mailed Feb. 10, 2006 cited in related U.S. Appl. No. 10/187,859.
Office Action mailed Jul. 21, 2006 cited in related U.S. Appl. No. 10/187,859.
Office Action mailed Dec. 5, 2006 cited in related U.S. Appl. No. 10/187,859.
Notice of Allowance May 10, 2007 cited in related U.S. Appl. No. 10/187,859.
Data Conversion Laboratory, Inc. n.d. "Converting Your Data into Corporate Assets: Converting the World's Knowledge Getting an Encyclopedia on the Web." 4pp. Available http://www.dclab.com/encyclopedia.asp, Jun. 13, 2001.
American National Standards Institute Electronic Standards Store, n.d. "Information Retrieval Application Service Devinition and Protocol Specification for Open Systems Interconnection". 2pp. Available http:webstore.ansi.org/ansidocstore.product. Document ANSI/NISO Z39.50-1995.
Z/MBOL Overview. N.D. "Metadata Indexing & Searching from Fretwell-Downing." 1pg.
Braspenning, Peter J., et al. Jul. 2001 Conceptual Agent-Based Architectures for Artifactual Information Systems: How to Realize the Virtual Reference Room Concept? 15pp.
Burcham, Sarah. 1995. ACM Crosswords Xrds2-1: Harvest.4pp. Available http://www.acm.org/crossroads/xrds2-1/harvest.html.
Eom, Sean B. 2001. "Data Warehousing". International Encyclopedia of Business and Management, 2nd Edition, Edited by Malcom Warner. 10pp: International Thompson Business Publishing Co., London.

Meers, Dan and Tom Meers, Introduction by William H. Inmon. Oct. 2001. "RODIN by Coglin Mill: Data Warehousing Success for IBM e-servers: A Product Line Review." 20.pp Available Billinmon.com.
Slonim, Noam and Naftali Tishby, Document Clustering Using Word Clusters Via the Information Bottleneck Method, School of Computer Science and Engineering and the Interdiciplinary Center for Neural Computation, The Hebrew University, Jerusalem 91904, Isreal Jul. 2000 pp. 208-215.
Topalogulu, N. Yasemin et al., "Characterization of Centralized and Decentralized Text Information Retrieval Search Platforms Using OMT" Advances in Computer and Information Sciences IOS Press (1998) pp. 519-526.
Can, Fazli "On the Efficiency of Best-Match Cluster Searches" Information Processing& Management (1994); vol. 30, No. 3, pp. 343-361.
Rude, Gerda et al. "Natural language Access to Free-Text Databases" Proceedings of the Forty-Fourth FIS Congress Helsinki, Finland Aug. 28-Sep. 1, 1998, pp. 153-162.
Vries, John K. et al. "An automated Indexing System Utilizing Semantic Net Expansion" Computers and Bio-medical Research (1992) vol. 25, pp. 153-167.
Samstag-Schnock, Uwe and Charles T. Meadow "PBS: An Economical Natural Query Interpreter" Journal of the American Society for Information Science (1993); 44(5): 265-272.
U.S. Appl. No. 11/841,289, filed Oct. 19, 2010, Office Action.

* cited by examiner

CONTENT DATA INDEXING AND RESULT RANKING

RELATED PATENT APPLICATIONS

This patent application is a continuation of non-provisional U.S. patent application Ser. No. 10/187,859, entitled "CONTENT DATA INDEXING," filed Jul. 1, 2002 which issued as U.S. Pat. No. 7,266,553 on Sep. 4, 2007. This patent application is also related to non-provisional, co-pending U.S. application Ser. No. 11/841,289, entitled "CONTENT DATA INDEXING WITH CONTENT ASSOCIATIONS" filed on Aug. 20, 2007, to U.S. application Ser. No. 09/867,228, entitled "METHOD AND SYSTEM FOR SEARCHING INDEX DATABASES", which issued as U.S. Pat. No. 6,775,666 on Aug. 10, 2004, and to U.S. application Ser. No. 10/335,654, entitled "DATABASE BUILD FOR WEB DELIVERY", which issued as U.S. Pat. No. 6,983,287 on Jan. 3, 2006. Each of the above are also assigned to Microsoft Corporation and are expressly hereby incorporated by reference in their entireties.

FIELD OF THE INVENTION

The present invention relates to searching content data and more specifically relates to the indexing of content data in a build process to optimize search speed and efficacy during a run-time process.

BACKGROUND OF THE INVENTION

In response to the development of computers that can process increasingly larger amounts of data, encyclopedias, dictionaries, and other content data applications have been implemented in electronic form. Such content data applications make it possible to compile and make available vast amounts of information. However to be useful, the data must be searchable. More recent developments include the implementation of such data applications in a network environment, such as over the Internet. Typically, network implementations can require significant system resources (e.g., computer memory and processor time) to effectively process search queries.

One example of a data content application is the "ENCARTA" brand Multimedia Encyclopedia Application developed and marketed by Microsoft Corporation of Redmond, Wash. The "ENCARTA" brand Multimedia Encyclopedia Application can be run as a stand-alone application on an individual computer or can be operated over a network, such as the Internet. Electronic encyclopedias typically have a massive content data volume that includes all of the articles and other media necessary to render an electronic version of an encyclopedia.

However, to be efficiently used data content applications must be able to process search queries effectively and quickly. As the amount of content increases, the need for more speed increases. Various prior art systems have been developed to speed up content data searching. One of the most common methods of speeding data searching is to use partial data searching. This method speeds data searching by designating only a subset of the entire body of data as searchable. Another known method is to associate searchable key words with an un-searchable body of text data, whereby a search query is processed only against the key words and a match results in returning a reference to the un-searchable body of text data. Neither of these methods is completely satisfactory, because it is impossible to fully predict what search terms a user will select to query a particular body of text data. Consequently, match results are likely to be less than comprehensive.

Obviously, full content data searching is better, but it is typically cost prohibitive in prior art systems, because of the demands on system resources. Therefore, there is a need in the art for an efficient full content data searching technique. The technique should work with disparate content data sources and disparate content data types. The technique also should minimize search times by utilizing a build process to pre-process the full content data to streamline searching during run-time operation. The technique also should support natural word search queries and should use alternative search words and word pairs to increase the accuracy of search results and search process speed.

SUMMARY OF THE INVENTION

The present invention provides a full content data indexing system for processing content data associated with data applications such as electronic encyclopedia and dictionary applications. A build process collects content data from various sources, processes the content data into constituent parts, including alternative word sets, and stores the constituent parts in structured database tables. A nm-time process is used to query the database tables and the results in order to provide effective matches in an efficient manner. Run-time processing is optimized by preprocessing all query-independent steps during the build process. A double word table representing all possible word pair combinations for each index entry and an alternative word table are used to further optimize run-time processing.

The build process can break the content data down into words and tokens with a Natural Language Parser (NLP) and apply an alternative word set to identify likely alternative search terms corresponding to the words and tokens. The build process stores the words and relationships in a set of database tables. The run-time process queries the database tables, ranks the results, and returns the best matches.

The present invention can solve the above problems by providing a search engine to better match user requests for information. The search engine allows users to search and retrieve information from a body of content data. It can provide users with general or specific queries to general or specific content in the body of information. For example, users can be directed to general information, such as the start of a long article, or to specific content within that article. An article outline and related articles also can be navigated. Queries can also be processed in a way that allows for quick results and an efficient use of system resources.

In one aspect of the invention, a computer system is provided for searching and retrieving information from at least one content source containing at least one content entity. The system includes a build process for storing content information associated with the content entity in an index stored in the searchable content database. The system also includes a run-time process that can receive at least one search term and processes the search term against the index in the searchable content database. The build process also can create an alt word table including at least one alternate word associated with the search term, so that the run-time process can identify a second match between the alternate word and the index and to return at least one search result corresponding to the second match.

In another aspect of the present invention, a method is provided for searching and retrieving content from at least one content source. The method includes a step of building a search index table having index entries corresponding to content information contained in the content source. The search index includes a double word table having at least one word pair corresponding to the index entries. When a search term is received, the search term is processed against a portion of the search index table including a word pair corresponding to the search term to determine whether a match is available. If a match is available, a search result is returned identifying a content entity.

The various aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention provide a full text indexing system for processing content associated with data applications such as encyclopedia and dictionary applications. A build process collects data from various sources, processes the data into constituent parts, including alternative word sets, and stores the constituent parts in structured database tables. A run-time process is used to query the database tables and the results in order to provide effective matches in an efficient manner. Run-time processing is optimized by preprocessing all query independent steps during the build process. A double word table representing all possible word pair combinations for each index entry and an alternative word table are used to further optimize run-time processing.

An Exemplary Operating Environment

Figure 1:
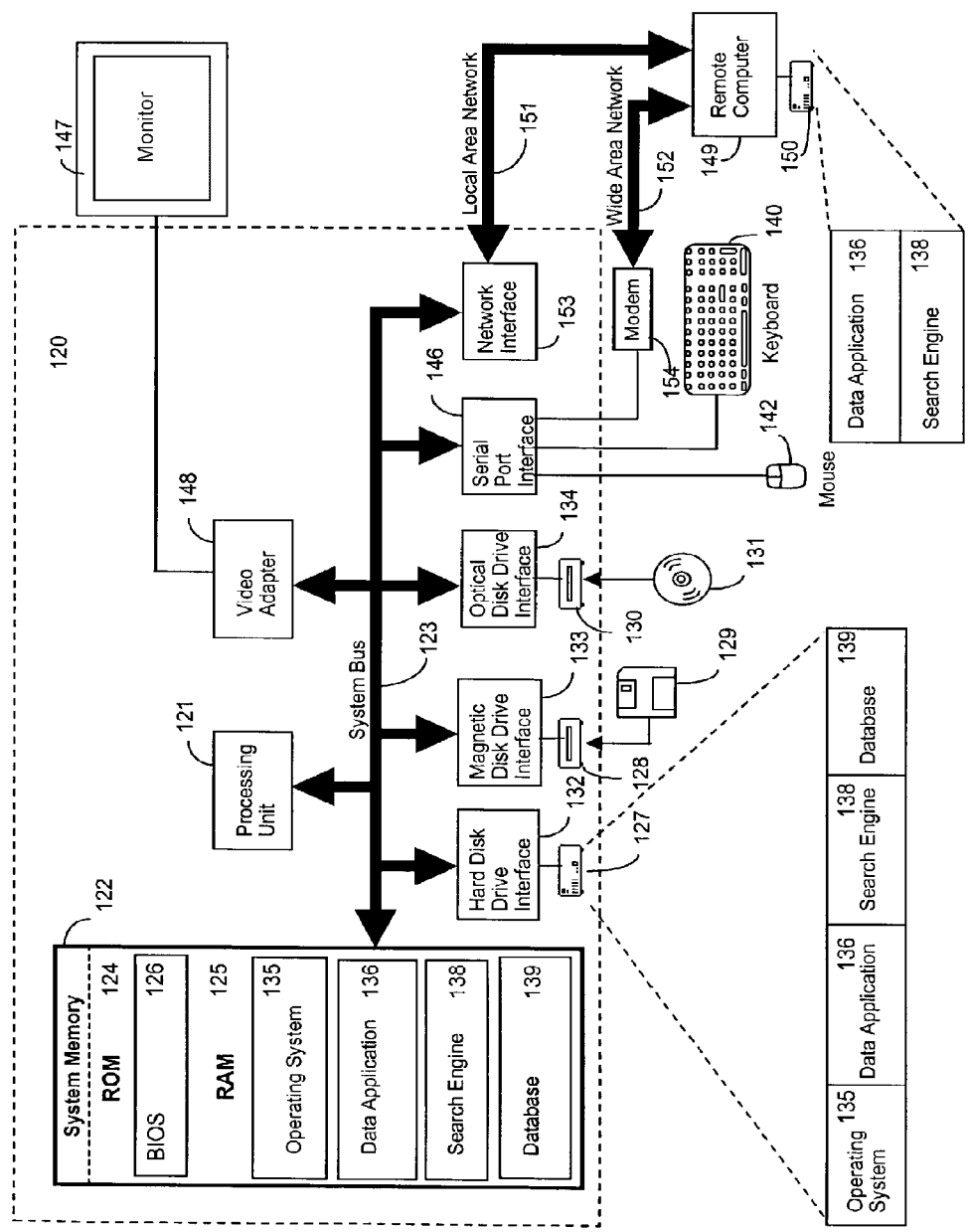
FIG. 1 is a block diagram illustrating an exemplary operating environment for implementation of various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a data application 136, a search engine 138, and a database 139. Program modules include routines, sub-routines, programs, objects, components, data structures, etc., which perform particular tasks or implement particular abstract data types. Aspects of the present invention may be implemented in the form of a search engine 138 that can operate in concert with the data application 136 and the database 139. The search engine 138 generally comprises computer-executable instructions for binding and searching index tables. The database 139 is generally accessible to the search engine 138, but also can be implemented as an integral part of the search engine.

A user may enter commands and information into personal computer 120 through input devices, such as a keyboard 140 and a pointing device 142. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the figure. The logical connections depicted in the figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
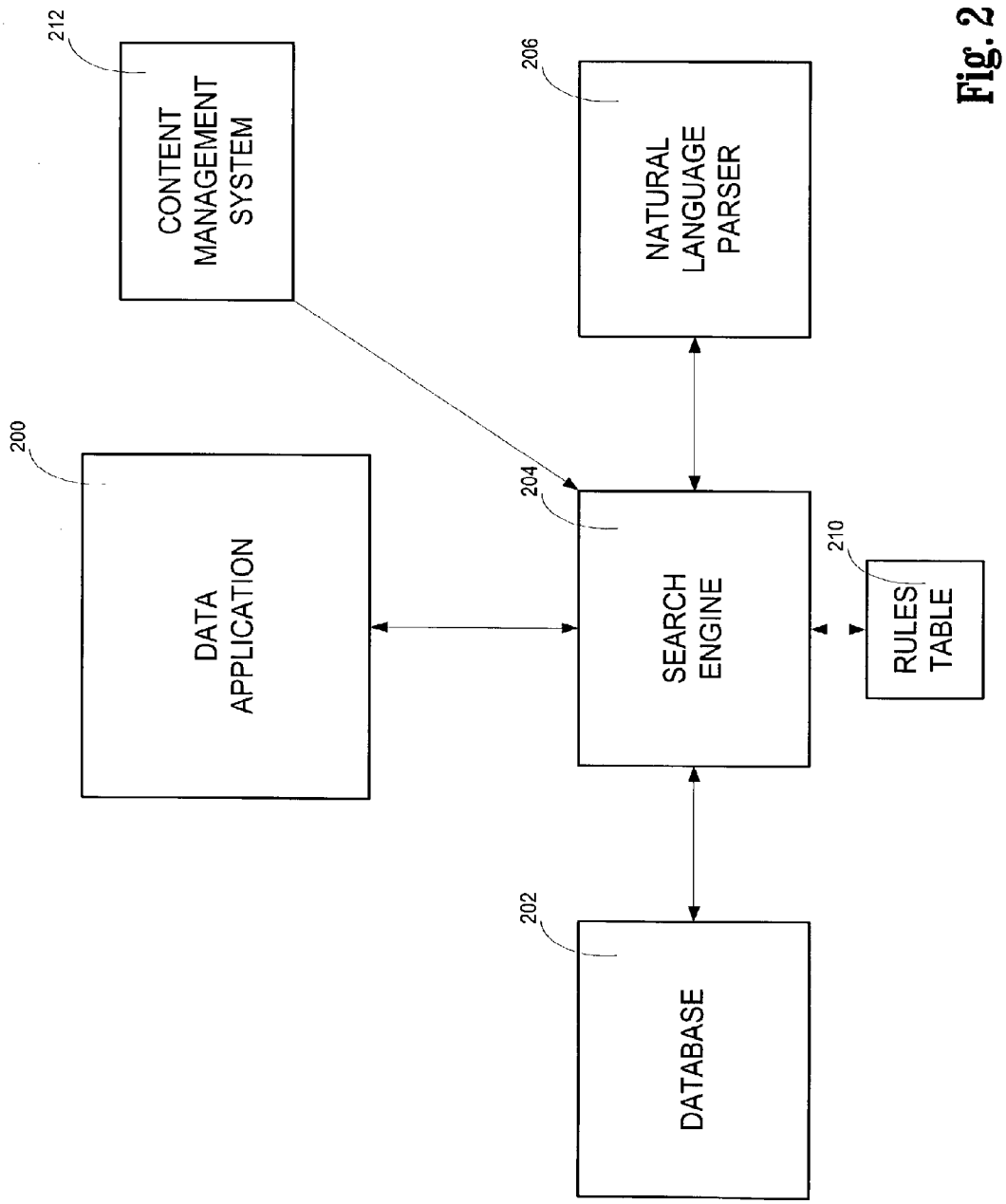
FIG. 2 is a block diagram depicting the primary functional components of an exemplary embodiment of the present invention.

FIG. 2 is a block diagram depicting the primary functional components of an exemplary embodiment of the present invention. In one embodiment of the present invention, a search engine 204 is used to process search queries generated as part of the normal operation of a data application 200. The data application 200 may be, for example, an encyclopedia application program, a dictionary application program, or any other data application that is associated with searchable data. Typically, a user of the data application 200 will generate a search query by entering a natural language query. In either case the search engine 204 can process the query and search the data in a database 202 for one or more entries matching the query. Obviously, various tolerances may be applied to the identification of a match, such that exact matches are returned as well as matches that are less than exact.

For the purposes of a data application 200 such as an encyclopedia, the database 202 may contain various kinds of entities such as articles, media, archive articles, audio files, video files, and index entries. In addition, the database 202 may include data associating one or more entries with one another. For example, the database 202 may include data linking an article with a side bar or with a related archive article. These associations may be represented by, for example, pointers, which are a well-known means for representing relationships between data.

In one embodiment of the present invention, the entities that populate the database 202 may be managed by a content management system 212. Content management systems are known in the art and are typically used to manage the content of a website and other content-based applications. In an exemplary environment of the present invention, the search engine 204 builds the database 202 during a build process. The search engine 204 acquires content from the content management system 212 and builds a search index in the database 202. The content from the content management system 212 is processed and organized by the search engine 204 in accordance with rules that are stored in a rules table 210. Accordingly, the build process can be tailored to a particular application through the creation and modification of rules in the rules table 210.

In addition to the build process, a run-time process is also supported by an exemplary embodiment of the present invention. During run-time, the search engine 204 receives a query from the data application 200 and processes the query against the database 202. The search engine 204 may use a natural language parser 206 to process queries to optimize the search process. For example, if a query is entered as a natural language sentence or phrase, the natural language parser may reduce it to a set of key words by eliminating unnecessary words from the query.

As stated above, the data client application 200 may be run on a stand-alone computer or may be nm over a network, such as the internet. In either case, the runtime process should be optimized to return the best search results in the least amount of time. This is especially true for the on-line operation of the data application 200. On-line users of data client applications tend to be very sensitive to delays in the runtime process. Accordingly, the exemplary embodiments of the present invention are directed to optimizing run-time processing by implementing a novel build process that reduces the search time required to return acceptable search results in response to a search query.

Figure 3:
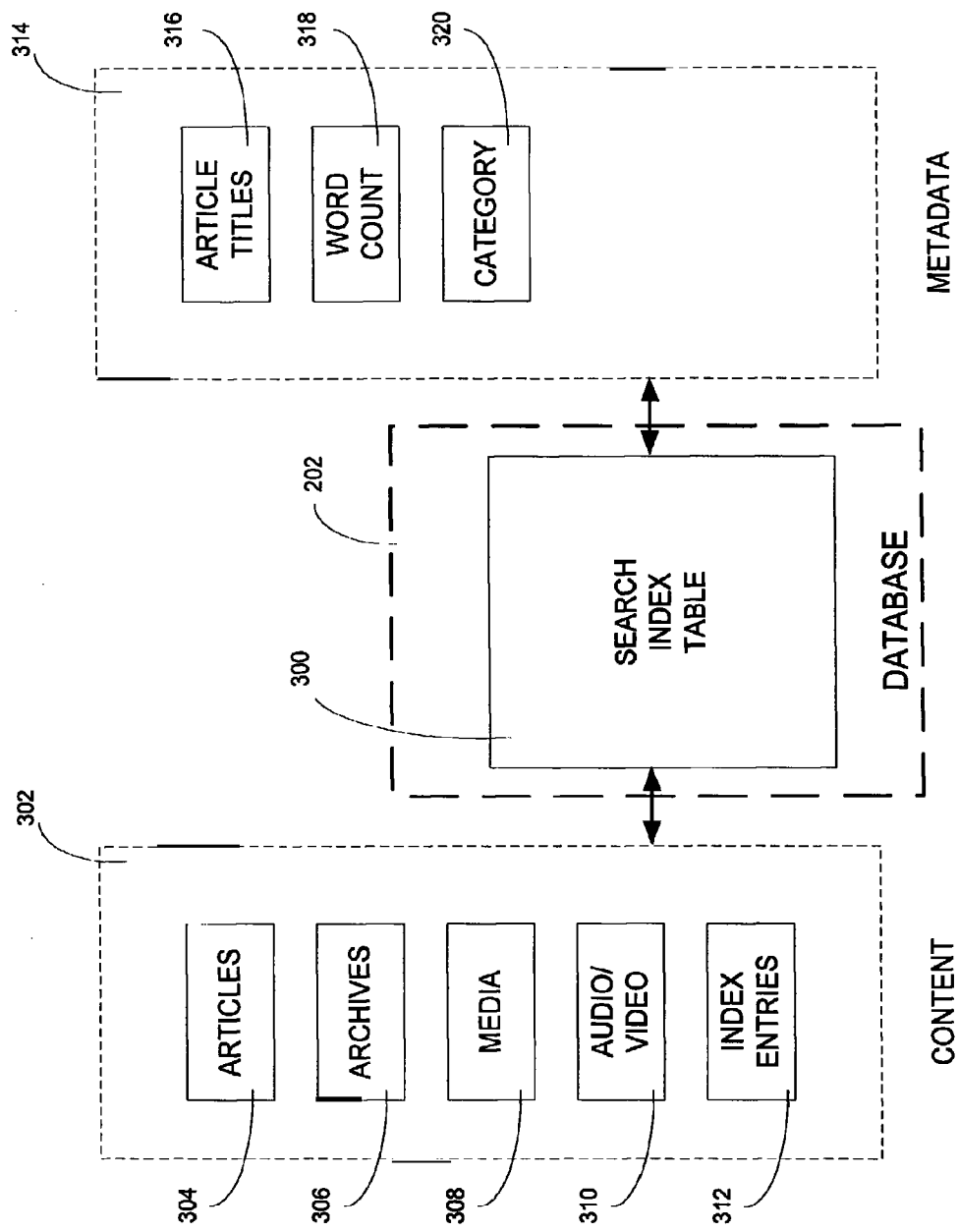
FIG. 3 is a block diagram depicting an exemplary search index that may be created as part of an exemplary build process.

FIG. 3 is a block diagram depicting an exemplary search index 300 that may be created as part of an exemplary build process. The search engine 204 may build a search index within the database 202 by processing content from the content management system 212 in accordance with rules in the rules table 210. The content may include articles 304, archives 306, media 308, audio and video files 310, and index entries 312. Those skilled in the art will appreciate that some content (e.g., audio files, media files) may be stored in a remote location outside the database by using pointers to identify the remote storage location. Each entity 302 may include one or more associated metadata items 314. Exemplary metadata items include article titles 316, article word counts 318 and article categories 320. Those skilled in the art will appreciate that the entities 302 and the metadata 314 described above are provided only as examples and that the various embodiments of the present invention can be used to process various kinds of entities and metadata besides those specifically listed.

Figure 4:
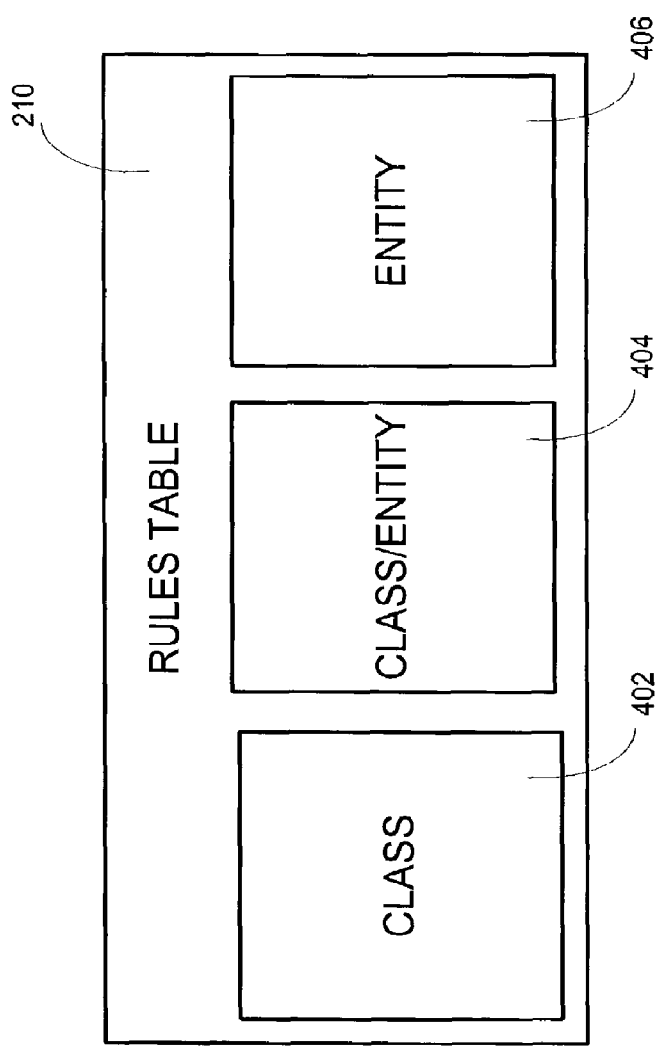
FIG. 4 is a block diagram depicting the primary components of an exemplary rules table.

As stated above, the search engine 204 applies rules from a rules table 210 to create the search index 300 within the database 202. FIG. 4 is a block diagram depicting the primary components of an exemplary rules table 210. The exemplary rules table 210 includes three' sub-tables. A class table 402 includes entries corresponding to all of the entities in the content management system 212—that will be affected by the build process. The rules table 210 also includes an entity table 406 which includes all of the metadata associated with the entities in the content management system 212 that are affected by the build process. A class/entity table 404 represents the intersection between the class table 402 and the entity table 406. In an exemplary embodiment, a search source table (not shown) may be used to group index entries into an appropriate rank, based on the search source with which the index entry is associated.

The rules tables 402, 404, 406 can be used to determine the structure of the search index 300. The rules tables 210 determine, for example, which data is indexed in the search index table, which data is available following the build process, and which data is processed by the build process. Advantageously, the rules table 210 can be used by the search engine 204 to create tables within the search index table 300 that represent associations between content data, so that at run-time, queries can be processed more effectively and more efficiently. Specifically, exemplary embodiments of the present invention perform substantially all non-query specific search operations during the build process. Accordingly, the run-time process (i.e., the search process) is optimized by the elimination of run-time operations.

Figure 5:
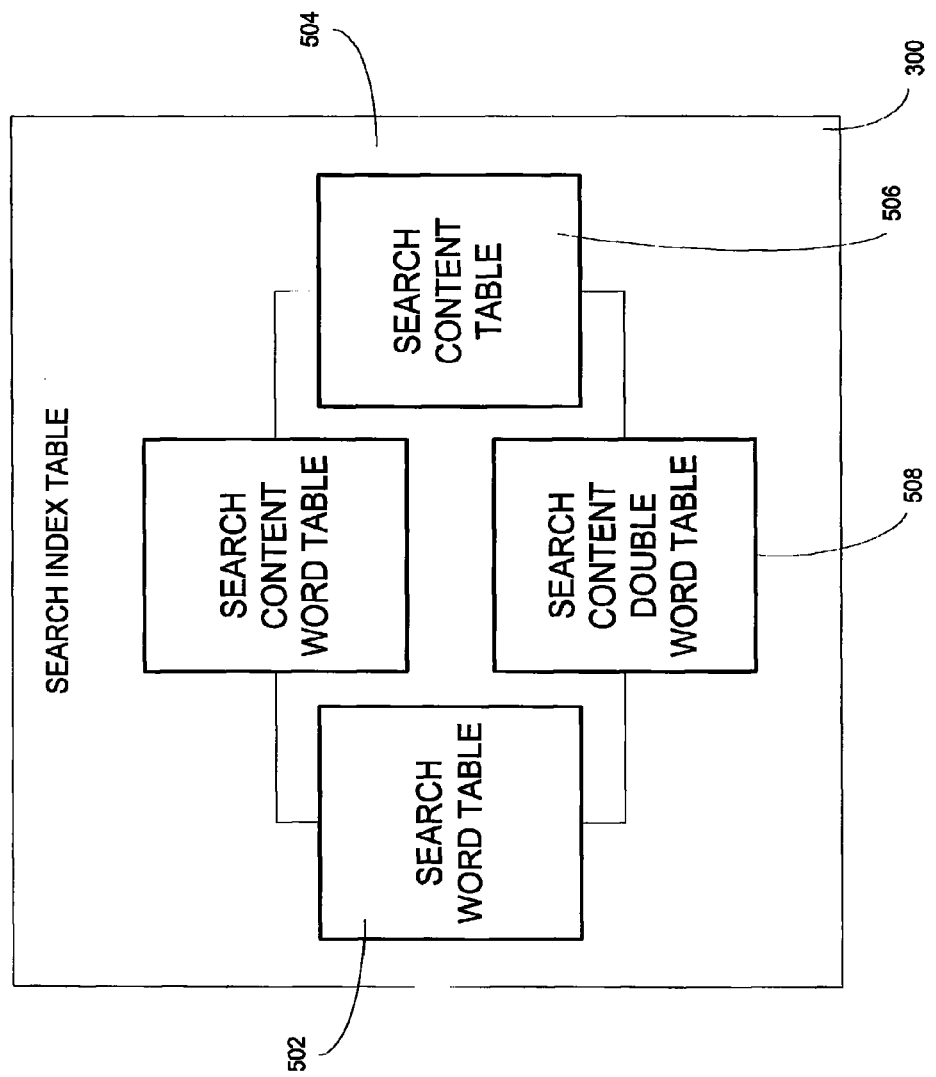
FIG. 5 is a block diagram depicting an exemplary search index table.

One purpose of the build process is to process all content data into tables that can be more easily and efficiently queried during run-time. FIG. 5 is a block diagram depicting an exemplary search index table 300. As stated above, the search index table 300 is created as part of the build process to enable a more effective and efficient search operation during the run-time process. In order to optimize the runtime process, the build process creates four tables 502-508 within the search index table 300. The four tables are the search word table 502, the search content word table 504, the search content table 506, and the search content double word table 508.

The purpose of the build process is to populate these four tables for use in processing search queries during subsequent run-time operation. The search content double word table 508 serves the purpose of storing word or token pairs that have been identified in the content data. By storing the double words, unnecessary search operations can be avoided. For example, where a search query includes the search terms "Russian" and "History", the double word table 508 can be used to identify index entries that include this word pair, thereby reducing the number of entries that must be processed.

The search content table 506 contains a complete list of anything that is indexed and/or searched on including, but not limited to, index entries, titles, sentences, and section titles. The search word table 502 contains a list of unique words, but does not include any stop words. The search content word table 504 includes words that are attached to each entry in the search content table in a predefined order, but contains no duplicates. The search content double word table is substantially identical to the search content word table, except that it includes unordered, unique pairs within a single search content table entry.

Figure 6:
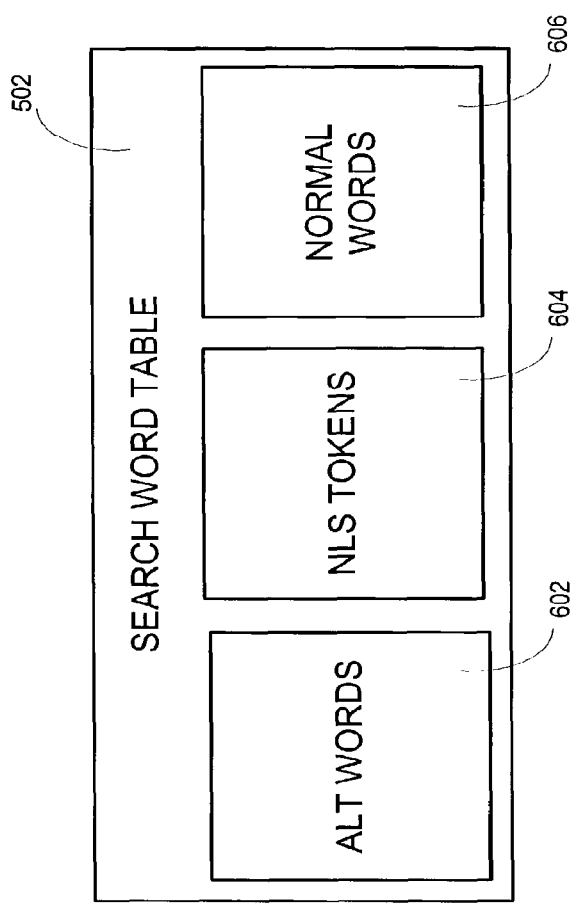
FIG. 6 is a block diagram depicting an exemplary search word table.

FIG. 6 is a block diagram depicting an exemplary search word table 502. The search word table includes three data types 602, 604, and 606. An alt words data type 602 contains alternative words that represent words that are similar to one or more words or tokens in the search query. Alt words can include synonyms, common misspellings, and common phrases associated with the query terms. All of the words that are identified as part of a set share an identical identification number (or other unique identifier). An NLS tokens data type 604 contains tokens that may be found among query terms. The identification and processing of tokens can reduce search times by recognizing that the two or more words of the token should be processed as a single token. Finally, the search word table 502 includes a normal words data type 606. The normal words data type simply contains all of the normal words that are contained in the content and that are not found in the other two data types.

Figure 7:
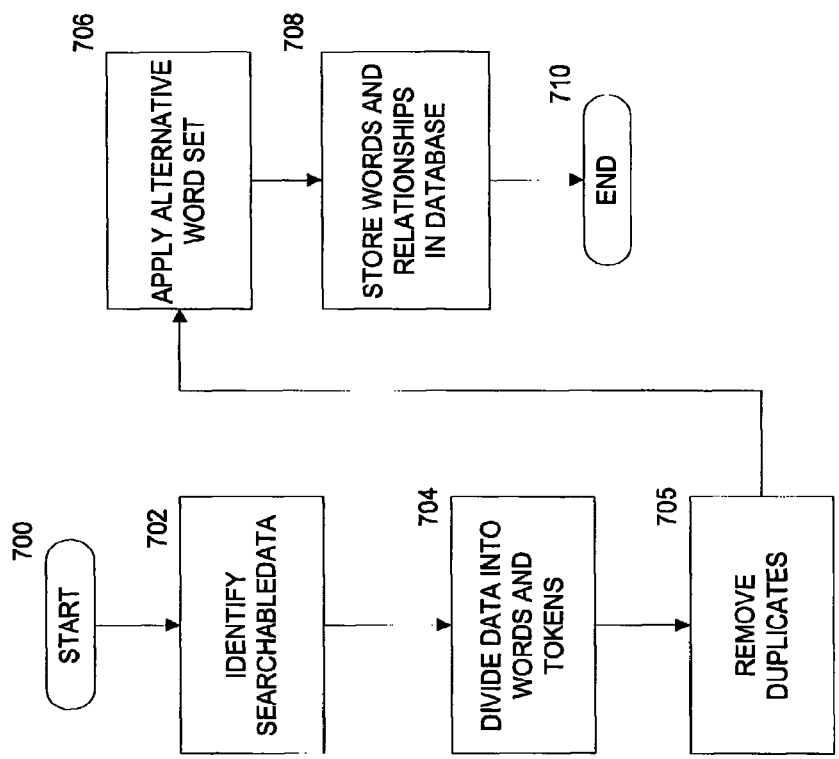
FIG. 7 is a flow chart depicting an overview of an exemplary build process.

FIG. 7 is a flow chart depicting an overview of an exemplary build process. FIG. 7 begins at start block 700 and proceeds to step 702. At step 702, the searchable data is identified. This step can be performed by identifying a data source, such as a content management system. The identified data is searchable to the extent that the data can be compared to a query to produce a set of matches.

Once the data source has been identified, the method proceeds to step 704. At step 704, the text data is divided into words and tokens. As described above, tokens are representations of words that are commonly found together and can include one or more words. Step 704 can be performed by a word parsing module such as a natural language parser or natural language system.

Once the text data has been divided into words and tokens, the method proceeds to step 705. At step 705, all duplicates are removed, and the method proceeds to step 706, wherein an alternative word set is applied. In step 706, alternative words associated with a word or token found in the data, can be identified. Typically, alternative words consist of synonyms, common misspellings, and common related phrases. When alternative words are associated with a particular word or token, a subsequent search for that particular word or token can be made more efficient. In short, alternative words are words that are expected to be found in a query directed to a target word which the alternative words are associated.

Once the alternative word sets have been applied, the target words and any relationships with alternative words are stored in a database at step 708. This database can be implemented as the search index table described above. Once this database has been created, the build method terminates by proceeding to end block 710. Accordingly, the build process is terminated and the database has been prepared for searching during a run-time process.

Figure 8:
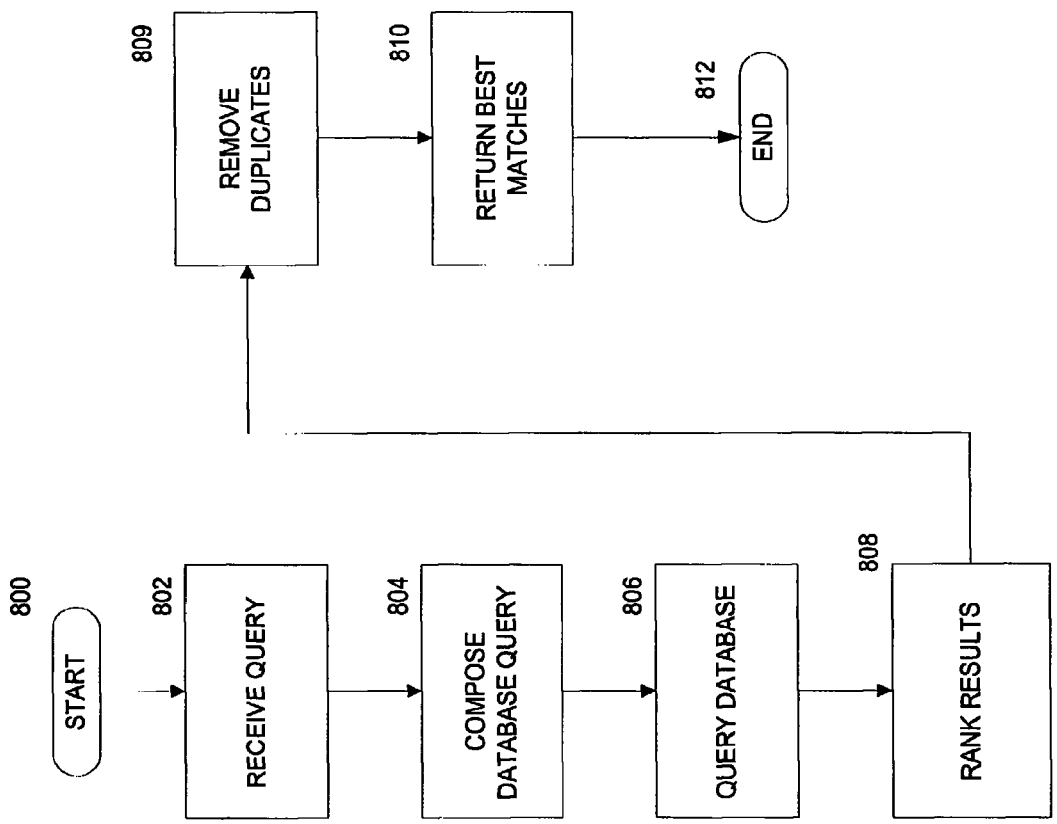
FIG. 8 is a flow chart depicting an exemplary method for performing a runtime process.

FIG. 8 is a flow chart depicting an exemplary method for performing a runtime process. The method of FIG. 8 begins at start block 800 and proceeds to step 802. At step 802, a query is received. This query is typically received from a user of a data client application, such as an encyclopedia program. Those skilled in the art will appreciate that any application for processing searchable data may serve as a source of such a query.

The method proceeds from step 802 to step 804. At step 804, a database query is composed. As described above, the original query received may contain natural word sentences or phrases or may contain other items that can hamper the search process. At step 804, the query is processed to make the query conducive to the known architecture of the database.

Once the database query has been composed in step 804, the method proceeds to step 806. At step 806, the database is queried. In short, the database query is compared to the database to generate a list of potential matches or results. As stated above, the database that is queried in step 806 could be a search index table.

The method proceeds from step 806 to step 808 and the results are ranked. The purpose of ranking the results is to provide the search results in descending order, based on a calculated likelihood that a particular result entry is a target of the search query.

The method proceeds from step 808 to step 809 and any duplicates are removed. The method proceeds from step 809 to step 810 and the best matches (i.e., those with the highest ranking) are returned. Those skilled in the art will appreciate that various threshold levels could be set to determine which results are returned. The method proceeds from step 810 to end block 812 and terminates.

Figure 9:
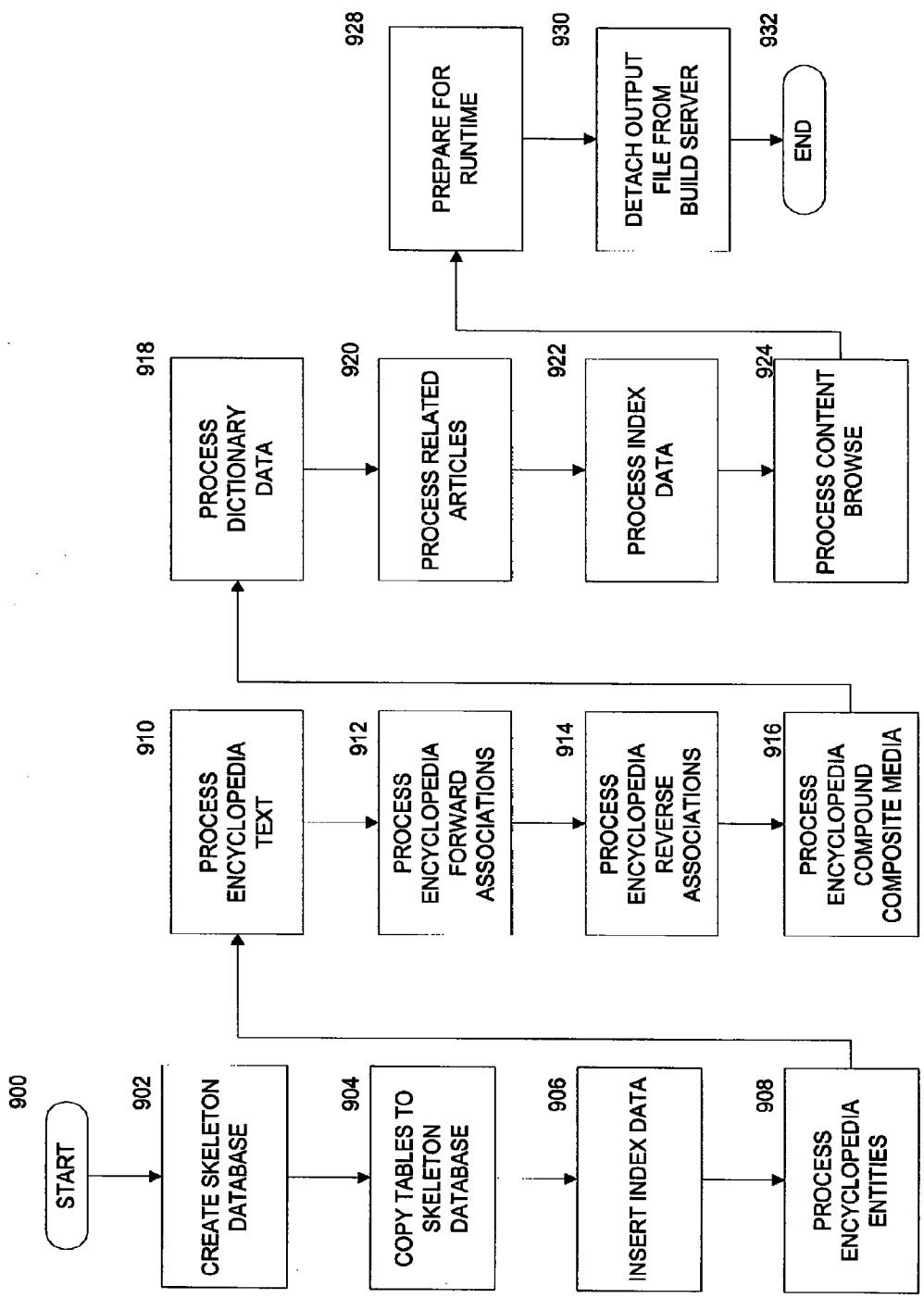
FIG. 9 is a flow chart depicting a detailed method for performing a build process of an exemplary embodiment of the present invention.

FIG. 9 is a flow chart depicting a detailed method for performing a build process of an exemplary embodiment of the present invention. The method begins at start block 900 and proceeds to step 902. At step 902, a skeleton database (i.e., empty database) is created to store the search index table and all supporting tables. The method proceeds from step 902 to step 904. At step 904, the supporting tables, including the class table, the class/entity table, and the entity table, are copied into the skeleton database. As stated above, these tables include the rules of how to process the content data.

The method proceeds from step 904 to step 906. At step 906, index data is inserted into the empty tables in the database. Index data include index entries that are essentially pointers to content. After the index entries have been inserted, the method proceeds from step 906 to step 908. At step 908, the encyclopedia entities are processed. In step 908, entities associated with the content of the encyclopedia data application are inserted in the search index. As stated above these entities include metadata associated with specific content. Such metadata can include article titles, word counts, and article categories. After the encyclopedia entities have been processed, the method proceeds from step 908 to step 910.

At step 910, the encyclopedia text is processed. In short, this step involves adding to the database text that corresponds to the entities processed in step 908. The method proceeds from step 910 to step 912. At step 912, forward associations are processed to associate entities in the database. For example, an encyclopedia article may be associated with media, a web link, or an archived article. These associations are established within the database so that the content will be properly associated at run-time.

The method proceeds from step 912 to step 914. At step 914, reverse associations are processed for the encyclopedia content. Reverse associations are helpful in cases where, for example, a search result may include a narrow content entity, but should also include the broader content entity that contains the narrow content entity. The reverse association process will establish a link that enables the search for include such flexibility. Those skilled in the art will appreciate that while there may be some overlap between forward associations and reverse associations, they are not necessarily mutually inclusive.

The method proceeds from step 914 to step 916. At step 916, compound and composite media are processed. Compound media are content entities that include more than one content entity, such as a picture and an associated audio file. Composite media are content entities that may include simple and compound content entities. The method proceeds from step 916 to step 918.

At step 918, dictionary data (as opposed to encyclopedia data) is processed in the same manner as described in connection with steps 908-916. In this embodiment of the present invention, processing is provided for an encyclopedia data application as well as for a dictionary data application. Those skilled in the art will appreciate that exemplary embodiments of the present invention may be used in conjunction with one or more data applications. The method proceeds from step 918 to step 920. At step 920, related articles are processed. Related articles are hierarchical lists of content related to a particular article.

The method of FIG. 9 proceeds from step 920 to step 922. At step index data is processed. In this step, the index data inserted in step 906 is stored in the database. In one embodiment of the present invention the index key words are stored in one or more of the four tables described in more detail in connection with FIG. 5. The method proceeds from step 922 to step 924. At step 924, content browse data is processed. This step essentially sorts content that belong to identified categories. At run-time, a user may browse the sorted articles based on an identified area of interest and/or category.

The method proceeds from step 924 to step 928. At step 928, the method prepares for run-time operation. In this step, the populated tables can be cleaned up so that unnecessary entries in the tables are removed. The method proceeds from step 928 to step 930. At step 930, the output file including the search index table and all other populated tables can be detached from the build server. The method proceeds from step 930 to end block 932 and terminates.

Figure 10:
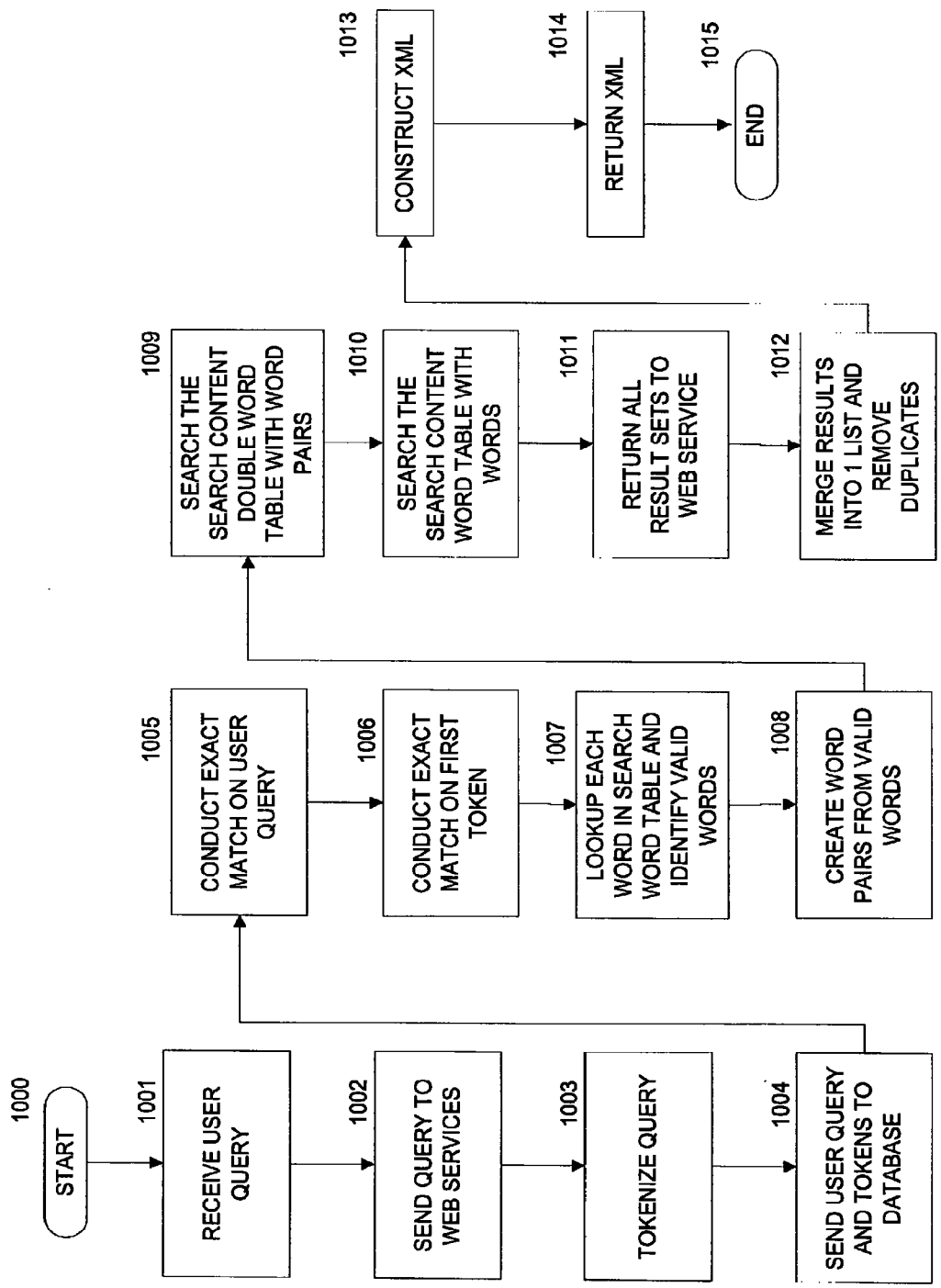
FIG. 10 is a flow chart depicting a detailed run-time operation method that is an exemplary embodiment of the present invention.

FIG. 10 is a flow chart depicting a detailed run-time operation method that is an exemplary embodiment of the present invention. The method of FIG. 10 begins at start block 1000 and proceeds to step 1001. At step 1001, a user query is received. The method proceeds from step 1001 to step 1002 and the query is transmitted for processing. In the embodiment depicted in FIG. 10, the query is sent to a web service which can be an application executed on a network-based machine. A web service is a module of application logic that can be made accessible to other functional modules by way of standard network (e.g., internet) protocols. Advantageously, this method of accessibility can usually be accomplished such that the web service can be provided in a platform-independent manner.

The method proceeds from step 1002 to step 1003. At step 1003, the query is converted to tokens. The method proceeds from step 1003 to step 1004 and the original user query and the tokenized query are sent to a database. The method proceeds to step 1005, wherein an exact match is conducted on the user query. The method proceeds from step 1005 to step 1006 and an exact match is conducted on the first token.

The method proceeds from step 1006 to step 1007. At step 1007, each word in the query is looked up in the search word table and all valid words are identified. The method then proceeds to step 1008 and word pairs are created from identified valid words. The method proceeds from step 1008 to step 1009. At step 1009, the search content double word table is searched using the word pairs created in step 1008. The method then proceeds to step 1010 and the search content word table is searched using the original words. The method then proceeds to step 1011 and all result sets produced by steps 1009 and 1010 are returned. In the embodiment of FIG. 10, these result sets are returned to the web service.

The method proceeds from step 1011 to step 1012, wherein the results are merged into a single list and duplicates are removed. The method then proceeds to step 1013 where the results list is converted to XML. The method proceeds from step 1013 to step 1014 and the XML-based results list is returned. The method then proceeds to end block 1015 and terminates.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. In a computing system having access to multiple content entities, each content entity including searchable content, a method for building a searchable content index for searching and retrieving content entities in an efficient manner that returns results of content entities expected to be found, the method comprising:

identifying searchable data within each of a plurality of content entities;

dividing text portions of the searchable data within each of the plurality of content entities into words and tokens, and storing each of the words and tokens in a first table;

removing from the first table each duplicate word and token;

applying an alternative word set to the first table after each duplicate word and token has been removed, wherein applying the alternative word set to the table includes adding to the first table alternative words associated with one or more of the words or tokens in the first table;

identifying all possible combinations of the words from the plurality of content entities; and creating a second table, wherein the second table is a double word table that includes only all possible unique two word combinations of words from the plurality of content entities.

2. A method as recited in claim 1, wherein identifying the searchable data comprises:

using a content management system to identify a data source.

3. A method as recited in claim 2, wherein the data source is an encyclopedic data source.

4. A method as recited in claim 1, wherein each token comprises at least two words representing words commonly found together.

5. A method as recited in claim 1, wherein dividing text portions of the searchable data within each of the plurality of content entities into words and tokens is performed by a parsing module incorporating a natural language parser.

6. A method as recited in claim 1, wherein applying an alternative word set to the table after each duplicate word and token has been removed comprises:

identifying alternative words for words and tokens in the table.

7. A method as recited in claim 6, wherein the identified alternative words include synonyms of the words and tokens in the table.

8. A method as recited in claim 6, wherein the identified alternative words include common misspellings of the words and tokens in the table.

9. A method as recited in claim 6, wherein the identified alternative words include common related phrases of the words and tokens in the table.

10. A method as recited in claim 1, wherein applying the alternative word set to the table includes:

within the table, creating an alt word table; and identifying one or more associations between different content entities and, separate from the alt word table, creating in the table one or more associations between the different content entities.

11. In a computing system having access to multiple content entities, each content entity including searchable content, a method for performing a run-time search of the searchable content to identify a ranked list of relevant content entities, the method comprising:

receiving, from a user of a client application, a query that includes one or more target search terms, the one or more target search terms being provided in a natural word format;

translating the query received from the user into a database query conducive to a known architecture of a database associated with searchable content, wherein the database includes at least a double word table, the double word table including only all possible unique two word combinations of words from the searchable content;

querying the database by comparing the database query to the database, thereby generating a list of content entities that are potential matches;

ranking the content entities in the list in descending order, based on a calculated likelihood that a particular entity is a target of the query from the user;

removing from the ranking any content entities that are duplicates; and returning, to the client application, a list of content entities with the highest ranking.

12. A method as recited in claim 11, wherein the client application is an encyclopedia application.

13. A method as recited in claim 11, wherein the client application is a dictionary application.

14. A method as recited in claim 11, wherein the database includes a search index table associated with searchable content.

15. A method as recited in claim 14, wherein the search index table includes:

a search content table listing all content entities that have been indexed; and a search content word table listing all words for each entry in the search content table, in a predefined order and without duplicates.

16. A method as recited in claim 15, wherein the search index table further includes:

a search word table listing all unique words and excluding all stop words.

17. A method as recited in claim 16, wherein the search word table includes an alt word table listing words similar to one or more words or tokens in target search terms.

18. A method as recited in claim 11, wherein returning, to the client application, a list of content entities with the highest ranking comprises:

returning to the client a list of only those content entities with a ranking above a predetermined threshold value.

19. A computer-readable storage medium having stored thereon computer-executable instructions that, when executed by a processor, cause a computing system to perform a method for performing a run-time search of the searchable content to identify a ranked list of relevant content entities, the method comprising:

receiving, from a user of a client application, a query that includes one or more target search terms, the one or more target search terms being provided in a natural word format;

translating the query received from the user into a database query conducive to a known architecture of a database associated with searchable content, wherein the database includes at least a double word table, the double word table including only all possible unique two word combinations of words from the searchable content;

querying the database by comparing the database query to the database, thereby generating a list of content entities that are potential matches;

ranking the content entities in the list in descending order, based on a calculated likelihood that a particular entity is a target of the query from the user;

removing from the ranking any content entities that are duplicates; and returning, to the client application, a list of content entities with the highest ranking.

* * * * *

UNITED STATES PATENT AND TRADEMARK OFFICE
CERTIFICATE OF CORRECTION

PATENT NO. : 7,987,189 B2  
APPLICATION NO. : 11/841332  
DATED : July 26, 2011  
INVENTOR(S) : Christopher Walter Anderson et al.

Page 1 of 1

It is certified that error appears in the above-identified patent and that said Letters Patent is hereby corrected as shown below:

Title page 2, in field (56), under "U.S. Patent Documents" column 1, line 70, below "7,584,175 B2 9/2009 Patterson" insert -- 7,593,932 B2 9/2009 Lindh et al. --.

Title page 2, in field (56), under "U.S. Patent Documents" column 2, line 11, below "2006/0031195 A1 2/2006 Patterson" insert -- 2006/0106792 A1 5/2006 Patterson --.

Title page 3, in field (56), under "Other Publications" column 2, line 26, below "U.S. Appl. No. 11/841,289, filed Oct. 19, 2010, Office Action." insert -- Notice of Allowance 22 Mar. 2011 cited in related U.S. Appl. No. 11/841,289. --.

In column 1, line 8, before "which issued as" delete "filed Jul. 1, 2002".

Signed and Sealed this  
Thirtieth Day of August, 2011

David J. Kappos  
*Director of the United States Patent and Trademark Office*